(12) United States Patent
Gottenbusch et al.

(10) Patent No.: US 11,324,225 B2
(45) Date of Patent: May 10, 2022

(54) SCORED PRETZEL BITE APPARATUS AND METHOD

(71) Applicant: DITSCH USA, LLC, Cincinnati, OH (US)

(72) Inventors: Gary Gottenbusch, Cincinnati, OH (US); Donald Kross, Cincinnati, OH (US)

(73) Assignee: DITSCH USA, LLC, Cincinnati, OH (US)

( * ) Notice: Subject to any disclaimer, the term of this patent is extended or adjusted under 35 U.S.C. 154(b) by 0 days.

(21) Appl. No.: 16/436,847

(22) Filed: Jun. 10, 2019

(65) Prior Publication Data

US 2019/0307135 A1 Oct. 10, 2019

Related U.S. Application Data

(63) Continuation of application No. PCT/US2018/066252, filed on Dec. 18, 2018.

(60) Provisional application No. 62/608,097, filed on Dec. 20, 2017.

(51) Int. Cl.
| | |
|---|---|
| A21D 8/02 | (2006.01) |
| A21C 11/10 | (2006.01) |
| A21C 11/12 | (2006.01) |
| A21C 3/06 | (2006.01) |
| A21C 3/02 | (2006.01) |
| A21D 13/40 | (2017.01) |
| A21D 13/00 | (2017.01) |

(52) U.S. Cl.
CPC ............... *A21D 8/02* (2013.01); *A21C 3/02* (2013.01); *A21C 3/065* (2013.01); *A21C 11/10* (2013.01); *A21C 11/12* (2013.01); *A21D 13/40* (2017.01); *A21D 13/00* (2013.01)

(58) Field of Classification Search
None
See application file for complete search history.

(56) References Cited

U.S. PATENT DOCUMENTS 5,312,633 A * 5/1994 Schwartz ............... A21D 13/31
426/138

OTHER PUBLICATIONS

FL: Fresh Loaf: Scoring Bread; published online at least by Jan. 27, 2015 at: https://web.archive.org/web/20150127075514/http://www.thefreshloaf.com/handbook/scoring (Year: 2015).*

(Continued)

*Primary Examiner* — Patricia A George
(74) *Attorney, Agent, or Firm* — Jenei LLC

(57) ABSTRACT

A method of making a soft pretzel bite includes cutting a series of transverse slots on one lateral side of a dough strip, curling the transverse slotted dough strip into a respective rolled dough strip, exposing each transverse slot, and transversely cutting each rolled dough strip into dough bites. The method includes washing each dough bite in a caustic solution with the length of each transverse slot being sufficient for excess caustic solution to drain way from the dough bite. The dough bite is baked into a pretzel bite. Each transverse slot allows a volume of the pretzel bite to increase without being constrained by a pretzel skin formed around each transverse slot to aerate an interior of each pretzel bite.

6 Claims, 11 Drawing Sheets

(56) References Cited

OTHER PUBLICATIONS

NFB: National Festival of Bread: Bread shaping ideas; published online at least by Aug. 31, 2016 at: https://web.archive.org/web/20160831091837/http://nationalfestivalofbreads.com/bread-shaping-ideas (Year: 2016).*
Sally: Sally's Baking Addiction: Easy Pretzel Rolls; published Aug. 11, 2017 at: Sally: https://sallysbakingaddiction.com/easy-pretzel-rolls/ (Year: 2017).*
FR: Food Reference: Five factors to get your bread to rise; published online at least by Nov. 27, 2006 at: https://web.archive.org/web/20061127133451/http://www.foodreference.com/html/bread-rising-729.html (Year: 2006).*
Sol: How It's Made, Pretzels; published online Dec. 16, 2011 at: https://www.youtube.com/watch?v=z9Ofxx5Sb7Q (Year: 2011).*

\* cited by examiner

SCORED PRETZEL BITE APPARATUS AND METHOD

CROSS-REFERENCE TO RELATED APPLICATIONS

The present Application for Patent claims priority to U.S. Provisional Application No. 62/608,097 entitled "SCORED PRETZEL BITE APPARATUS AND METHOD," filed Dec. 20, 2017, and to PCT Application No. PCT/US2018/066252 entitled "SCORED PRETZEL BITE APPARATUS AND METHOD," filed Dec. 18, 2018, both of which are hereby expressly incorporated by reference herein.

BACKGROUND

1. Technical Field

The present disclosure generally relates to pretzel dough processing machine and method, and more particularly to such a machine and method that produces soft pretzels.

2. Description of the Related Art

Pretzels are a popular food product that relies on washing soda or lye treatment on a bread dough before baking. The resulting pretzels have a traditional "skin" and flavor obtained through the Maillard chemical reaction between amino acids and reducing sugars. Although hard pretzels have a long shelf life and are readily available, increasingly soft pretzels are made available through a number of vender and frozen food channels. Achieving a balance between the traditional pretzel exterior and a soft interior can be difficult to attain.

BRIEF SUMMARY

In one aspect, the present disclosure provides a method of making a soft pretzel bite. In one or more embodiments, the method includes conveying a one or more dough strips. The method includes cutting a series of transverse slots on one lateral side of each one of the one or more dough strips, each transverse slot terminating a proximal distance to the one lateral side and spaced so that at least one transverse slot is received in each eventual pretzel bite and extending beyond a midpoint of the respective dough strip. The method includes curling each one of the one or more transverse slotted dough strips into a respective rolled dough strip, exposing each transverse slot across the rolled dough strip. The method includes transversely cutting each rolled dough strip into dough bites. The method includes washing each dough bite in a caustic solution. Each end of an exposed transverse slot extends lower than a midpoint of the exposed transverse slot allowing excess caustic solution to drain away from the dough bite. The method includes baking the dough bite into a pretzel bite. Each transverse slot allows a volume of the pretzel bite to increase without being constrained by a pretzel skin formed around each transverse slot to aerate an interior of each pretzel bite.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
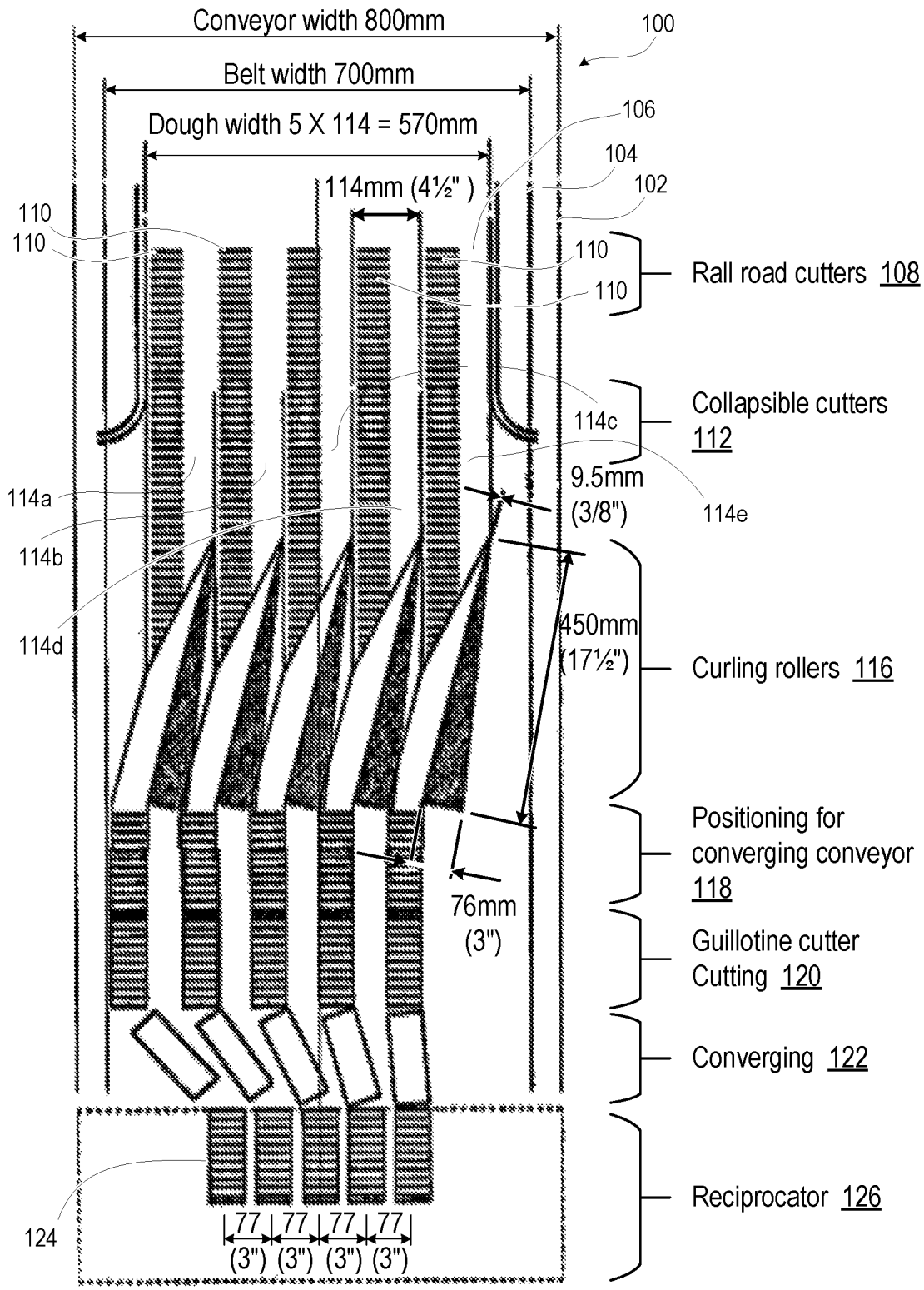
FIG. 1 illustrates a simplified top diagram of a soft pretzel dough forming machine, according to one or more embodiments.

The present invention provides for a soft pretzel-making machine automatically makes soft pretzel bites that have a soft interior with a split pretzel skin for expansion. Slots formed in the unbaked pretzel skin are sized to ensure that a caustic solution used during processing drains away from an exposed interior of the unbaked pretzel bite.

In the present invention, the food items are formed from dough. The dough used in the present invention can be any type of edible dough, including, for example, laminated or non-laminated dough, dough with some sweeteners added, doughs that are leavened, doughs that have been fermented, doughs with flavorings and/or doughs with inclusions or toppings.

The dough useful in the present invention includes those selected from the group consisting of: multi-grain; rice-based; corn-based; rye-based; soda style; wheat-based; butter dough; flavored dough; whole grain-based; cornmeal-based; gluten-free; graham-based; and flatbread style.

The dough useful in the present invention is made according to methods generally known in the art, and includes mixing flour, fat and moisture (ordinarily water) and most often, salt. Optional ingredients, such as flavors, inclusions, colors, nutritional supplements, leavening agents, emulsifiers, etc. may be added as well. The dough may then be sheeted, rolled, or formed according to skill in the art.

The flour component in dough useful in the present invention may be any edible flour, including hard wheat flour, soft wheat flour, corn flour, multi-grain flour, rye flour, rice flour, barley flour, graham flour, whole wheat flour, high amylose flour, low amylose flour, and the like. Different grain constituents lend different texture, taste, and appearance to a baked good. Flours useful herein are of a conventional type and quality including cake flour, bread flour, and all-purpose flour. Wheat flours are preferred but other flours conventionally used in the preparation of baked goods are also employed in full or partial substitution for the wheat flour. One protein range for wheat flour used in the present invention is between about 7 to 15% by weight of the flour. A general all-purpose flour is also usable. This type of all-purpose flour generally comprises a mixture of both hard and soft wheat flours, i.e., both high protein level and low protein level flours. Such flours are useful if the average protein content ranges from about 7 to 15% by weight.

In one or more embodiments, the flour has average protein content range of at most 7, 7, 9, 10, 11, 12, 13, 14, 15% by weight. While chlorinated flours are used herein, unchlorinated flours are also usable because chlorination is an expensive, though unnecessary flour processing step. Unmalted flours may be used provided the flours are derived from wheats with minimal sprout damage. Enzyme inactivated flours are also usable. Flour having low polyphenol oxidase activity, flour having a flour enrichment with all reduced iron, a binder of metal ions, an organic acid, and the like are also usable in the present invention.

The first step in the process of making a pretzel bite is to mix the starting ingredients, which primarily comprises wheat flour. Other constituents can include corn syrup, corn oil, sodium bicarbonate, ammonium bicarbonate, malt syrup, and yeast.

In one or more embodiments, the dough composition has a water activity of from 0.9-0.95 or more in the raw dough and a water activity from 0.82-0.83 in the baked pretzel bite composition. In one or more embodiments, the dough composition has a water activity in the baked pretzel bite composition that is at most 0.78, 0.79, 0.80, 0.81, 0.82, 0.83, 0.84, or 0.85.

Water activity is defined as the current volume and availability of "free" water in a sample and should not be directly compared with the water content (g water/g substance). The water activity is given as the aw—value and ranges between 0 (absolute dryness) and 1 (condensed humidity). Only this component takes an active part in the exchange with the ambient humidity and can possibly form the ideal medium for microbiological growth on the surface which influences the microbiological stability. The water activity also has an important effect on the chemical reactions in food.

In one or more embodiments, the dough composition comprising flour, salt, water, yeast, and sugar. The dough composition could be many different types of dough sufficient to be usable as a bun. This could include rye, sourdough, whole wheat, white, wild rice, pumpernickel, and potato dough, for example. In one usable example, the portion of flour, salt, water, yeast, and sugar is as follows: 50-70% flour, 30-40% water, 1-3% yeast, and 1-2% salt.

In one or more additional embodiments, the portion of flour, salt, water, yeast, and sugar is as follows: 60% flour, 35.5% water, 2.8% yeast, and 1.7% salt. Some embodiments further include stabilizers or conditioners. Some embodiments include one or more of milk powder and sugar. There can be variations, depending upon taste and desired consistency. In one or more embodiments, the dough composition has a protein content of 5-15%. In other embodiments, the dough composition has a protein content of 8-13%.

In another embodiment, the ingredients include wheat flour, water, sweetener, salt, an emulsifier, yeast, calcium propionate, polyunsaturated fat, wheat, and gluten. The sweetener can be sugar or corn sweetener, among others, and the polyunsaturated fat is selected from the group consisting of sorbic acid and potassium sorbate. Additional ingredients may include, but are not limited to, guar gum, cornmeal, and citric acid. The emulsifier is selected from the group consisting of mono and diglycerides, Sodium Stearoyl Lactylate (SSL), and Diacetyl Tartaric Acid Esters of Monoglycerides (DATEM). In one form, the dough is mixed and kneaded for between approximately three (3) minutes and approximately five (5) minutes.

The fat component in a food item of the present invention comprises any edible fat, oil, or shortening, including those that are solid at room temperature and those that are liquid at room temperature. Liquid shortenings or oils are usable and provide an advantage of ease of incorporation. Solid shortening is usable and provides an advantage of desirable mouthfeel upon consumption of the baked good. More commonly used are mixtures of liquid and solid shortenings. These mixtures are fluid or plastic depending, in part, on the level of solid fatty materials. Liquid shortening includes animal shortening, marine fats, vegetable or synthetic oil, such as sucrose polyesters, which are liquid at ordinary room temperature. The fat component of the present invention may comprise natural or hydrogenated oils, including soybean oil, cottonseed oil, canola (rapeseed) oil, peanut oil, safflower oil, sesame oil, sunflower oil, poppyseed oil, coconut oil, palm oil, palm kernel oil, olive oil, butterfat, cocoa butter, tallow, lard, babassue, corn oil, or combinations thereof.

Sweeteners may optionally be added to the dough, but only at levels that do not interfere with the ability of the dough to form a sheet. According to the invention, any suitable sugar can be present, including liquid or dry sugars. Typical sweeteners include corn syrup, high fructose corn syrup, maltose, malt syrup, malt syrup solids, honey, maple syrup, rice syrup, rice syrup solids, sorghum syrup, refiners syrup, corn syrup solids, dextrose, fructose, crystalline fructose, galactose, glucose, lactose, sucrose, brown or invert sugars, molasses and other compositions that substantially comprise sugars, whether crystalline, syrup or other physical form, and combinations thereof. Preferably, the food items of the present invention comprise sucrose in the form of granulated sugar. Sugar substitutes can also be used according to the invention, including, for example, saccharine, acesulfone K, aspartame, sucralose, d-tagatose and the like. Such sugar substitutes can be used in addition to, or as a substitute for, the sweetener.

The food items optionally further comprise emulsifiers. Generally useful emulsifier components are partially esterified polyhydric compounds having surface-active properties. This class of emulsifiers includes among others, mono and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulphuric acid esters, such as dodecylglyceryl ether sulfate and monostearin phosphate. Other examples include the partial esters of hydroxy carboxylic acid such as lactic, citric, and tartaric acids with polyhydric compounds, for example, glycerol lacto palmitate and the polyoxyethylene ethers of fatty esters of polyhydric alcohols, such as polyoxyethylene ether of sorbitan monostearate or distearate. Fatty acids alone or esterified with a hydroxy carboxylic acid, e.g., stearyl-2-lactylate are also useful. In certain variations, all or a portion of the emulsifier component is pre-blended with the shortening or fat component. However, in other variations, a portion of the emulsifiers can be pre-hydrated and added along with the other wet ingredients. In still other variations, the emulsifiers can be plated onto various solid carriers such as flour, starch, sugars, milk powders, and the like, and admixed in with the various dry ingredients.

The food items of the present invention also optimally comprise salt for flavor and function. Any food-grade salt is acceptable, although those in the art are aware that certain salts lend themselves to better results than others. For instance, the salt may be chosen from, but is not limited to, sodium chloride, potassium chloride, calcium chloride, naturally occurring sea or other salts, or combinations thereof. In an alternate embodiment, the invention involves an enrobed salt application step. Enrobed salt is a fat encapsulated salt that is resistant to being dissolved by water vapor.

Food items of the present invention may also comprise a leavening component. The leavening component may be a chemical leavening agent such as ammonium bicarbonate, an acid/base system, or a fermentation-leavening agent, such as yeast. An acid/base leavening component triggers a release of carbon dioxide upon contact with moisture. The carbon dioxide gas aerates the dough during mixing and baking to provide a light, porous cell structure, fine grain, and a texture with desirable appearance and palatability. Basic leavening agents suitable for use in the present invention include, for example, sodium bicarbonate and other bicarbonates and/or carbonates. Typically, sodium bicarbonate is the selected basic leavening agent because it is stable and relatively inexpensive to produce. Acidic leavening agents suitable for use in the present invention include, for example, sodium or calcium salts or ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-deltalactone (GDL), potassium hydrogen tartrate (cream of tartar), and the like. In one embodiment, the acidic leavening agent includes sodium aluminum phosphate. The one or more of the leavening agents may optionally be encapsulated, either the leavening base or the leavening acid, or both. The evolution of carbon dioxide essentially follows the stoichiometry of a typical acid-base reaction. The amount of basic leavening agent present determines the amount of carbon dioxide evolved, whereas the type of acidic leavening agent affects the speed at which the carbon dioxide is liberated. An excess amount of leavening base can impart a bitter flavor to the baked product while excess leavening acid can make the baked product tart.

Optionally, the present food items may comprise additional flavorant components, inclusions, and/or nutritive enhancers. Flavorants may be any of those known in the art and may include, cheese, cheese powder, yeasts, spices, paprika, garlic, herbs, flavors, fruit flavors, seeds, chocolate, etc. The resultant pretzels can be any style, including: multi-grain, water-style, nut-based, rice-based, corn-based, rye-based, whole grain, sesame, flatbread, butter-style, cream-style, hard breadstick, saltine, cheese flavor, herb flavor, fish flavor, chicken flavor, beef flavor, shrimp flavor, spice flavor, combination flavor, chemically leavened, pretzels with inclusions, yeast leavened, having a nut flavor, or any combination of those.

Inclusions may be any of those known in the art and may include oats, nutmeats, seeds, candy pieces, fruit pieces, etc. Nutritive enhancers may be any of those known in the art and may include vitamins, minerals, and fiber.

The present food items may also optionally comprise enzymes, according to criteria and processes known to those in the art. For instance, proteases, lipases, carbohydrases may optionally be added, to modify the structure, function or flavor of the end product.

These ingredients are typically mixed in a low-sheer mixer with water to a moisture level of between 38% and 45% by weight. The mixing takes place at ambient pressures and typically between 80 to 100° F. In one or more embodiments, the ingredients are a percent of the weight of flour with the mixture comprising 0.1-3% salt. In another embodiment, the mixture includes 0.5-2.5% salts. In another embodiment, the mixture includes 1-2% salts. In one or more embodiments, the ingredients are a percent of the weight of flour with the mixture comprising 2-20% fats and/or oils. In another embodiment, the mixture includes 2-12% fats and/or oils. In another embodiment, the mixture includes 2-8% fats and/or oils. In one or more embodiments, the ingredients are a percent of the weight of flour with the mixture comprising 0.1-12% yeast. In another embodiment, the mixture includes 0.5-10% yeast. In another embodiment, the mixture includes 1-8% yeast. In one or more embodiments, the mixture comprises malted barley or sugar or both in order to sustain yeast activity prior to baking. In one or more embodiments, the mixture comprises functional enzymes, preservatives or both in order to extend shelf life. In one or more embodiments, the mixture comprises amylase enzymes, which break up the starch chains to keep the pretzel bite from curling and hardening.

After the mixing step, the dough is fed into the feeding hopper.

In one or more embodiments, a method is employed: Step 1: Dough is placed in a hopper at start. Step 2. Doug comes out on floured conveyor as a thick roll. Step 3. Thick roll thinned into a first thin roll. Step 4. Thinned dough is conveyed, for example, and thinned to a dough thickness of less than 15, 14, 13, 12, 11, 10, 9, 8, 7, 6, or 5 mm or less. Step 5: Cut thinned dough with wheel cutters into dough strips. Step 6: Disk cut dough strips and trim. Step 7: Cone rolling of the dough occurs. Step 8: Convey continuous rolled and slightly flatten into oval. Step 9: Separate cut pretzel bites with a guillotine cut. Step 10: Convey for a time sufficient for proofing of the dough under controlled heat and humidity. Step 11: Convey through a causting bath machine. Step 12: Convey through a sorting machine into a narrower train of pretzel bites. Step 13. Convey into a fast freeze house. In one or more embodiments, a filling can be applied prior to the cone rolling of the dough in Step 7.

The transverse slit formed but cutting the dough into separate unbaked pretzel bites are sized to eventually lets caustic soda flow off to avoid bitter caustic "pudding" and later for allowing the pretzel bite to puff up during baking. Increases volume, width by cutting before shaping increases volume and width of the resulting product. By contrast, if cut after, the protein strands are broken and the stretch of proteins on the product is different. Consequently, the effect is barely noticeable and the outer layer does not open up as the volume increases. In addition, cutting deeper after shaping does not cause the product to open like the present innovation. Have to run diagonal cut but drag of blade moves the product. Labor intensive/expensive. This cutting is faster, more uniform, more expansion than having to manually diagonally. The manual alternative is also labor intensive, and thus expensive. The manual alternative moves the product on the conveyor, which is also disruptive of subsequent processes.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for some other embodiments.

FIG. 1 illustrates an automatic soft pretzel dough forming machine 100 that includes a conveyor 102 on which a conveyor belt 104 conveys dough 106 of width at least 100, 200, 300, 400, 500, 600, 700, 800, 900 mm or more. Rall road cutters 108 form a series of transverse slots 110 in parallel. In one embodiment, the rall road cutters 108 form a series of at least 2, 3, 4, 5, 6, or more transverse slots 110 in parallel. Then collapsible cutters 112 separate dough strips 114a-114e, each respectively having one laterally offset series of transverse slots 110. In one or more embodiments, the dough strips 114, each respectively having one laterally offset series of transverse slots 110, wherein the offset series of transverse slots 110 are cut into the dough strips 114 as offset from the centerline of each respective dough strip 114 by at least 10, 20, 30, 40, 50, 60, 70, 80, 90% or more.

In an exemplary embodiment, each respective dough strip is 50-250 mm wide with the series of transverse slots being spaced by 5-25 mm and being 5-100 mm wide. In another exemplary embodiment, each respective dough strip is 50-150 mm wide with the series of transverse slots being spaced by 5-20 mm and being 25-100 mm wide. After curling and transversely cutting the dough bite, each dough bite is 50-500 mm long with an oval cross section of 10-50 mm wide by 5-50 mm high.

The rollers can be made of various materials such as food grade polymers. If the rollers are constructed of stainless steel it has the advantages of being non-corrosive, easily manufactured, rugged, and can be polished smooth for easy cleaning and is therefore sanitary.

Curling rollers 116 roll each dough strip 114a-114e. A positioning section 118 provides proper longitudinal spacing for a guillotine cutter 120 followed by a converging section 122. The converging conveyor 122 is a set of offset flexible V-bands. At an upstream end, five groups of V-bands are widely laterally spaced on an idler pulley and at a downstream end, the five groups of V-bands are closely laterally spaced on a driver pulley so that unbaked pretzel bites 124 on a respective group of V-bands converge toward the center.

In one or more embodiments, the dough strips 114, each respectively having one laterally offset series of transverse slots 110, wherein the offset series of transverse slots 110 are cut into the dough strips 114 as offset from the centerline of each respective dough strip 114 by an amount such that when each dough strip 114 is rolled by a respective curling roller 116, the series of transverse slots 110 are positioned on the free rise side of the formed unbaked pretzel bites 124. After curling and transversely cutting the unbaked pretzel bite or dough bite on the free-rise side, each dough bite is 100-250 mm long with an oval cross section of 10-100 mm wide by 10-100 mm high. In one or more embodiments, each dough bite is 125-175 mm long with an oval cross section of 25-50 mm wide by 20-50 mm high. Then unbaked pretzel bites 124 formed thereby pass through a reciprocator 126 that conveys at slightly higher speed than the converging conveyor 122 to space out the unbaked pretzel bites 124.

By the term "free-rise side", it is meant that when the baked dough product is prepared, there is a portion of the product that is against the baking pan, which corresponds to the bottom side, and the portion that is remote from the bottom of the baking pan allowed to rise; it is the portion that is allowed to rise that corresponds to the free-rise side.

"Unbaked" means not fully baked to a moisture content of less than about 35%, 30%, 25%, 20% or less. "Unbaked" includes the conditions of never having been heated or partially heated.

"Weight percent" as used herein is based on the total weight of the composition unless indicated to the contrary.

Figure 2:
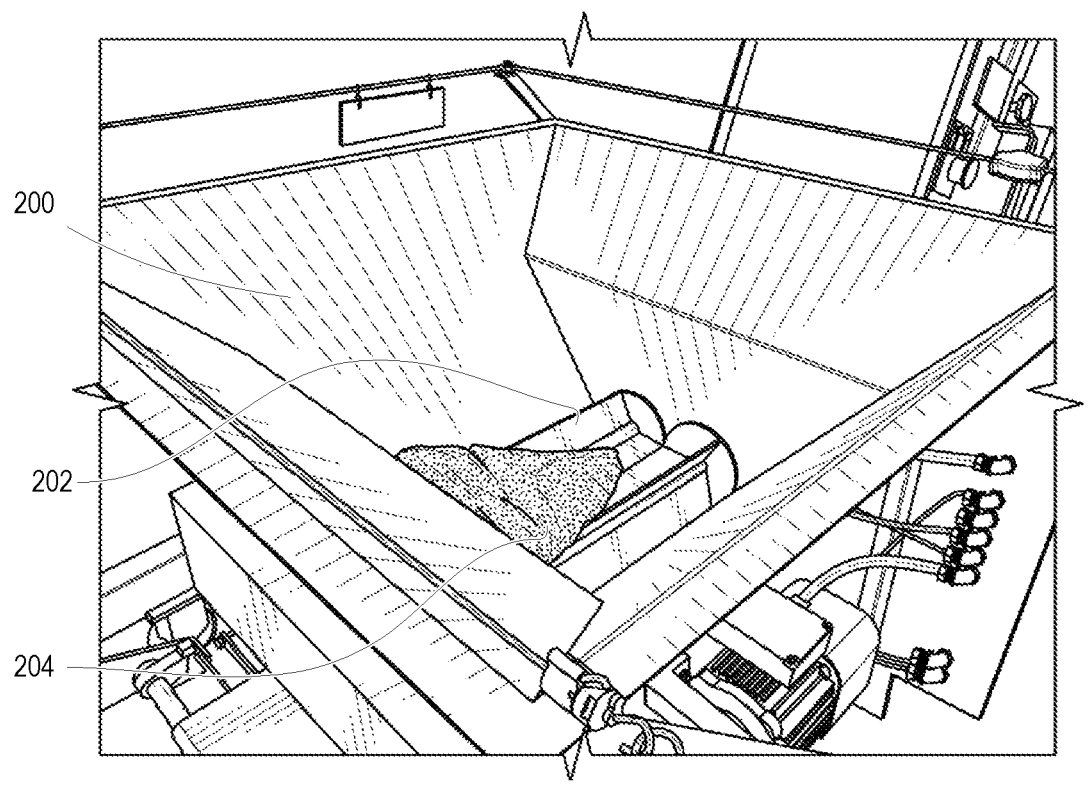
FIG. 2 illustrates a top perspective view of a dough hopper, according to one or more embodiments.
Figure 3:
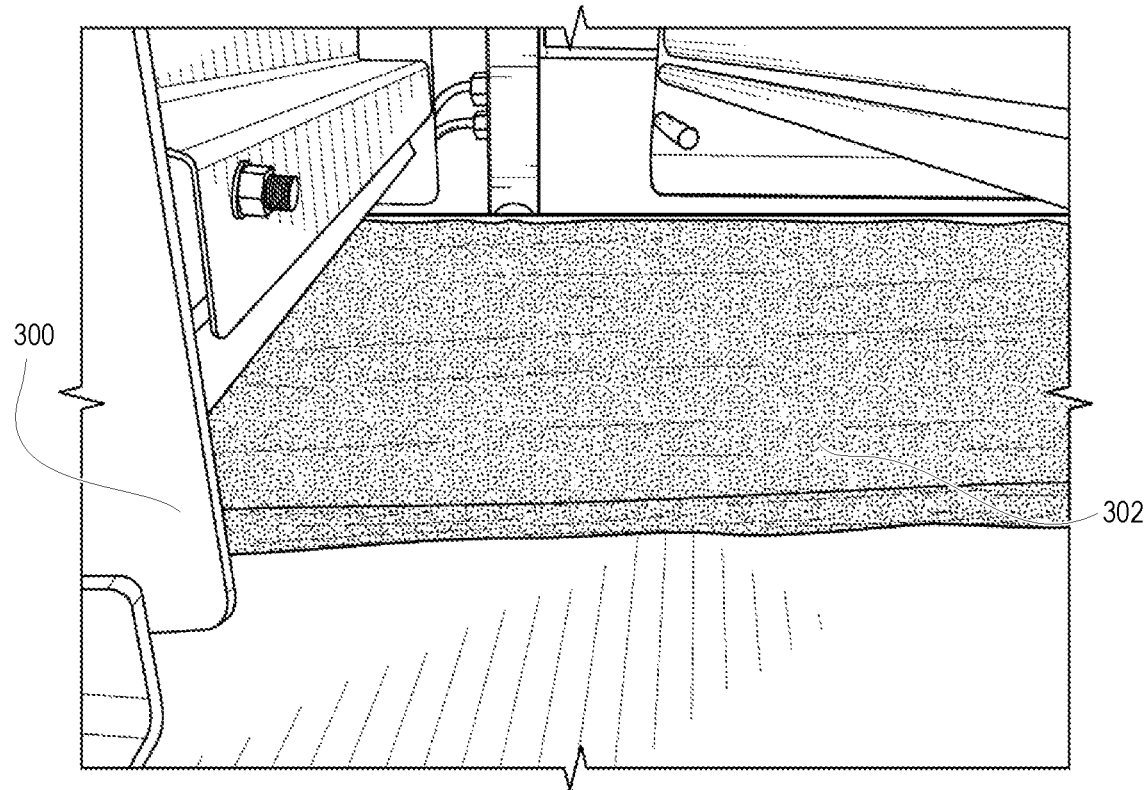
FIG. 3 illustrates a right perspective view of a conveyor conveying an untrimmed dough sheet 302 from the hopper, according to one or more embodiments.
Figure 4:
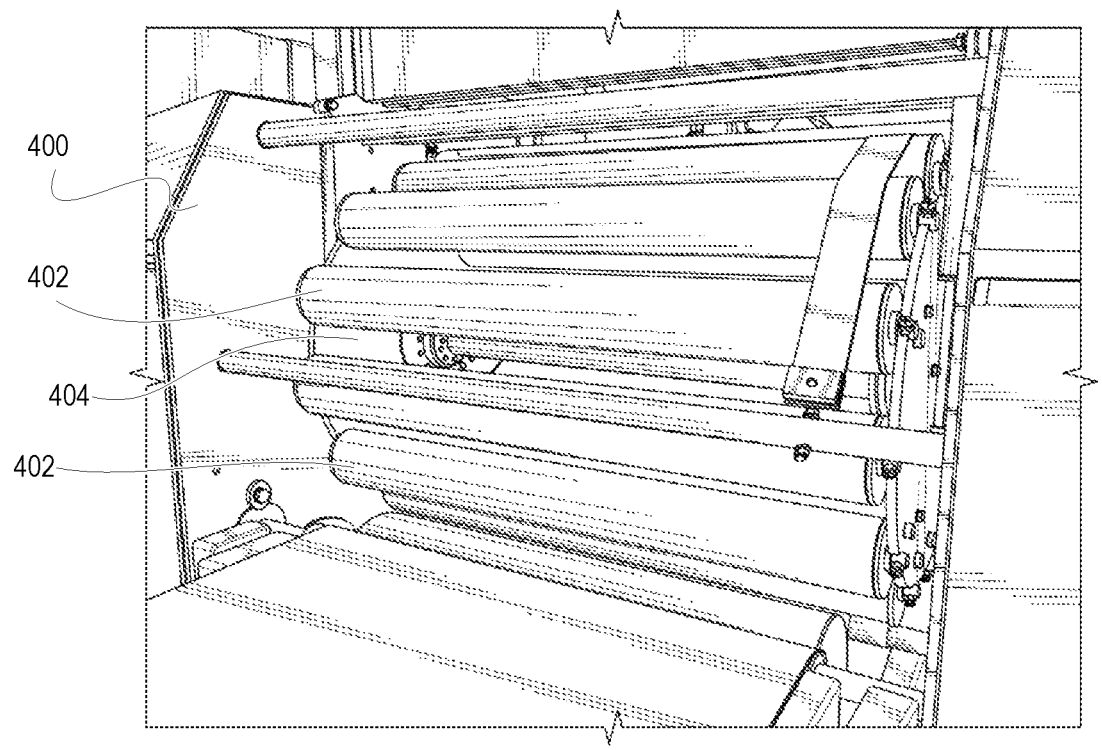
FIG. 4 illustrates a right perspective view of a multi-roller machine with twelve (12) small rollers that rotate counter to a larger wheel apparatus, according to one or more embodiments.
Figure 5:
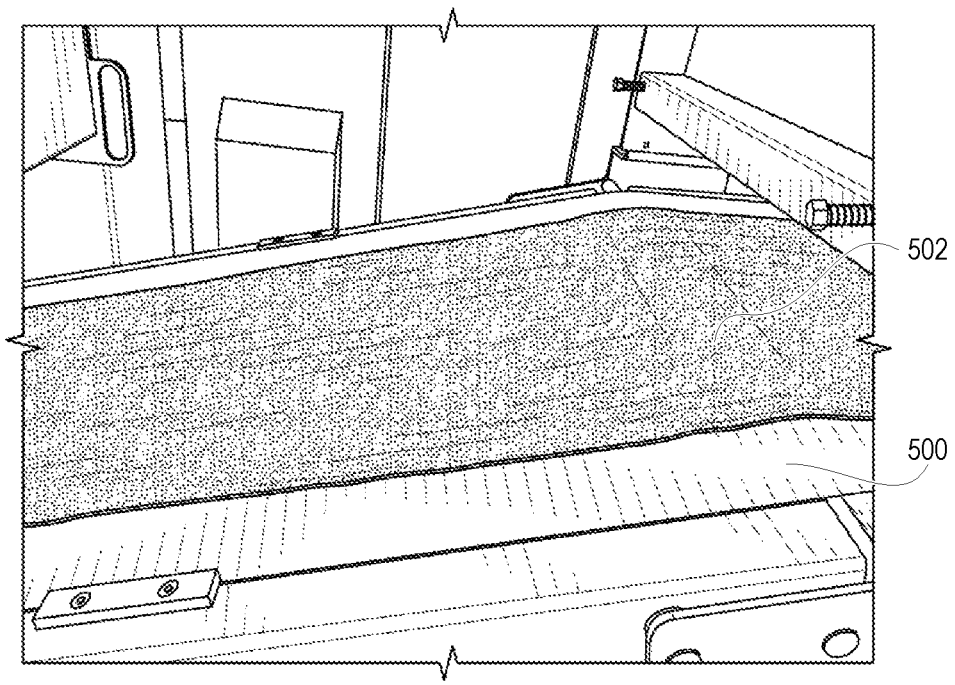
FIG. 5 illustrates a right perspective view of a conveyor conveying a thinned and trimmed dough sheet according to one or more embodiments.
Figure 6:
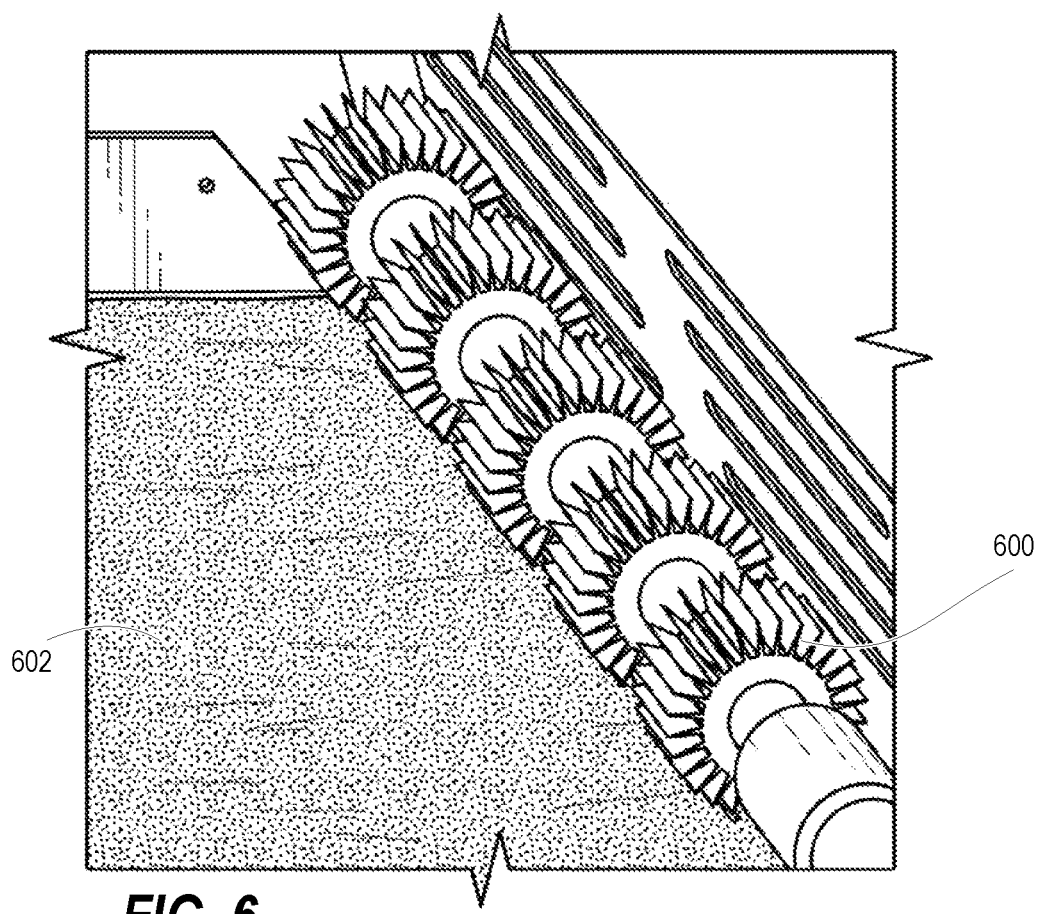
FIG. 6 illustrates a right perspective view of wheel cutters cutting transverse slots in a dough sheet according to one or more embodiments.
Figure 7:
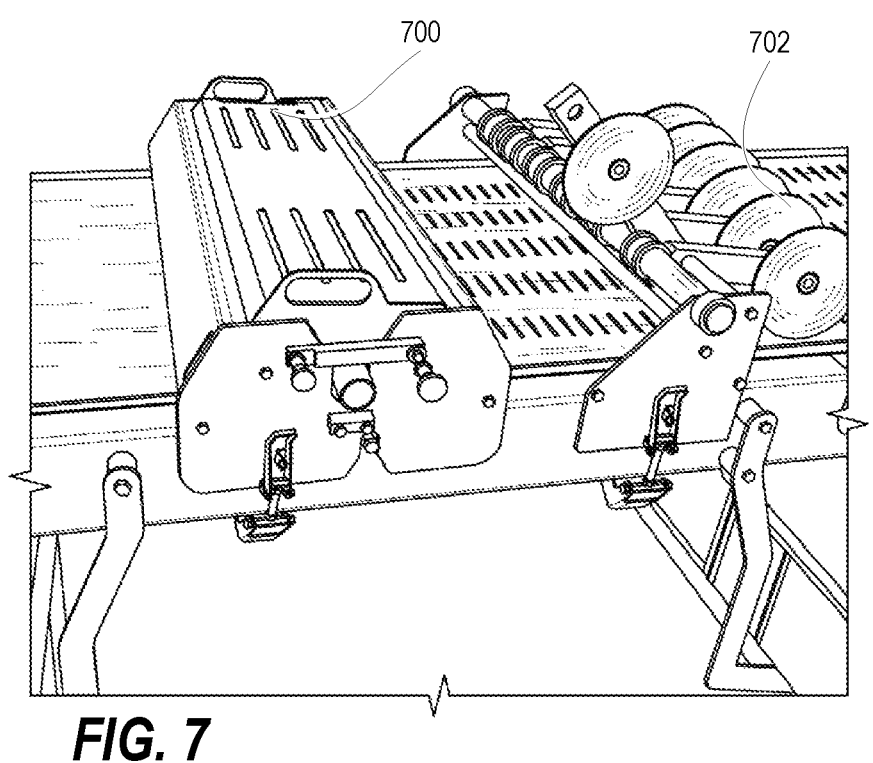
FIG. 7 illustrates a right perspective view of a cover guards the wheel cutters and that is followed by disc cutters that separate and trim the dough sheet into five dough strips according to one or more embodiments.
Figure 8:
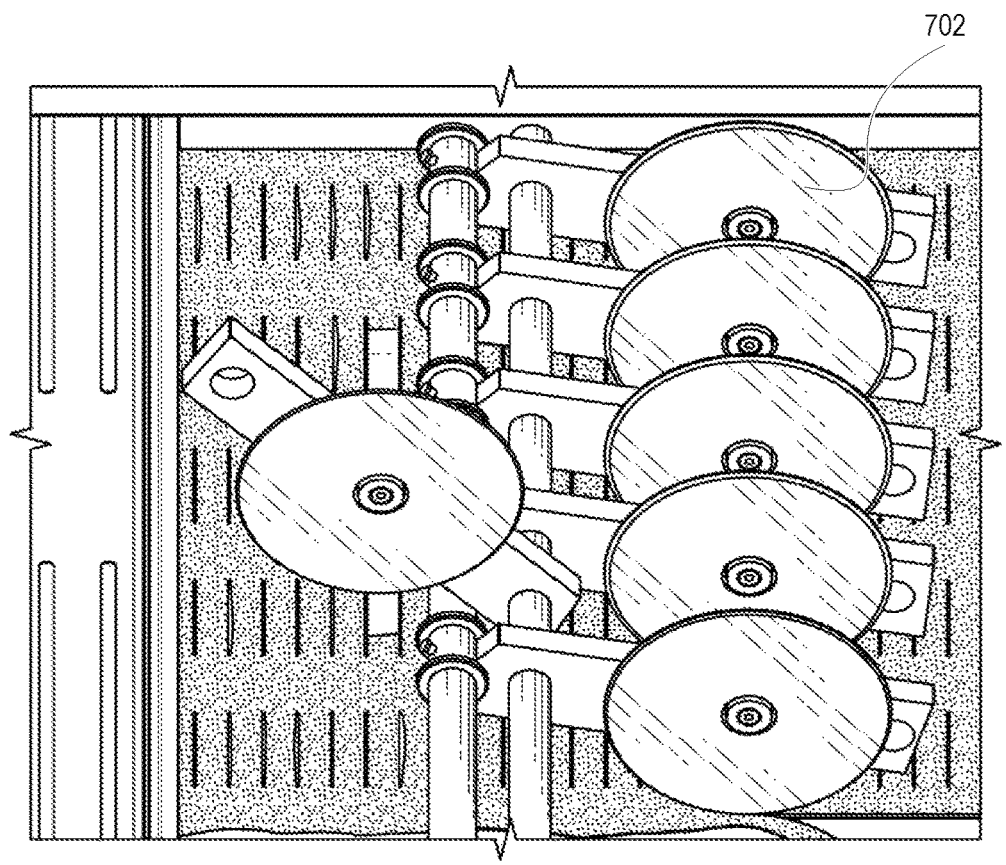
FIG. 8 illustrates a top perspective view of the disc cutters according to one or more embodiments.
Figure 9:
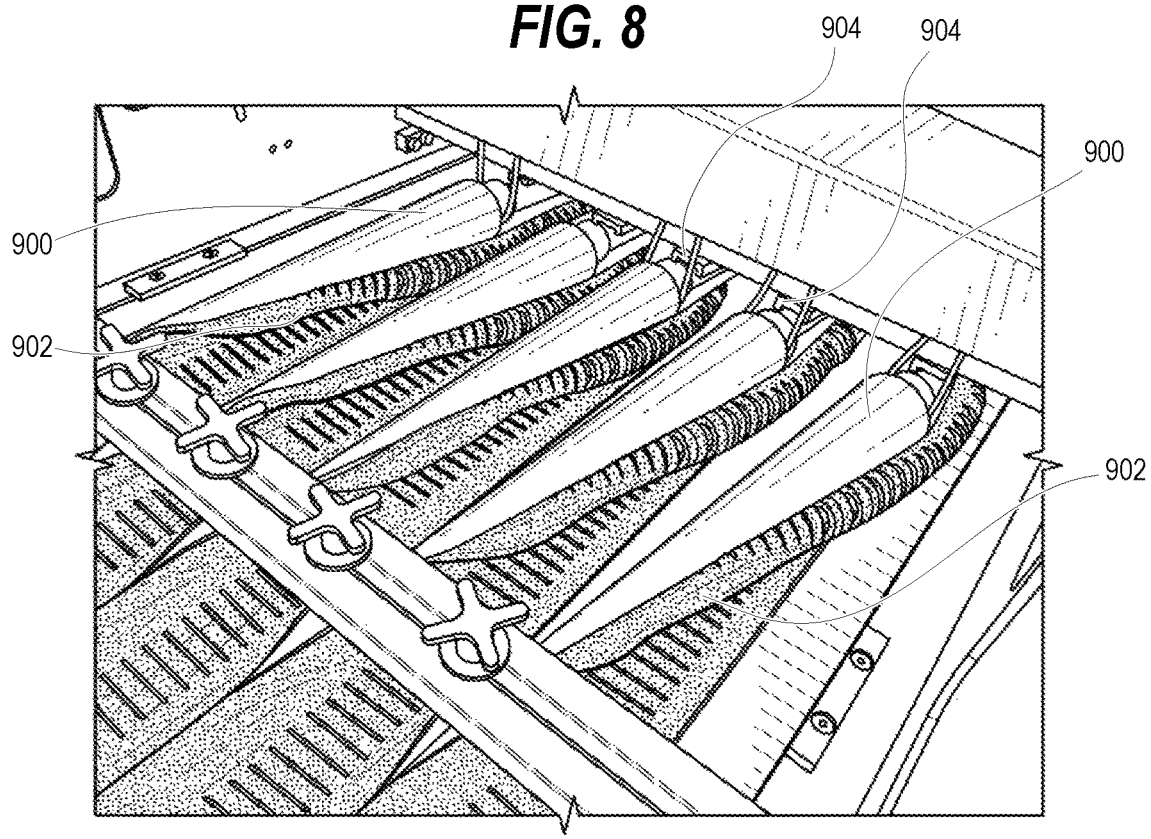
FIG. 9 illustrates a perspective view of cone rollers rolling each dough strip according to one or more embodiments.
Figure 10:
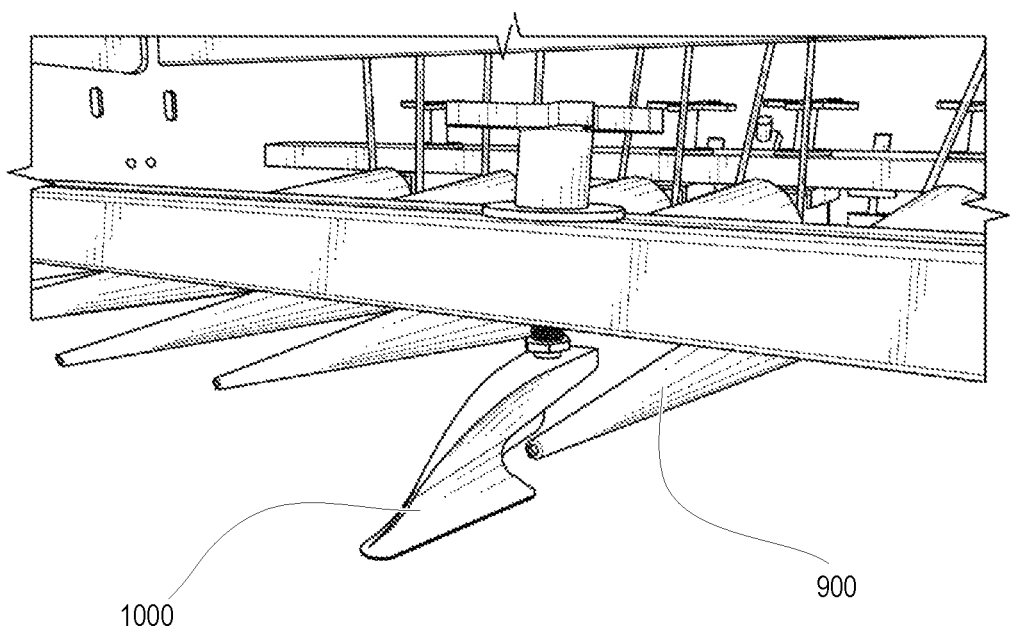
FIG. 10 illustrates a right perspective view of a plough upstream of and aligned with a cone roller, according to one or more embodiments.
Figure 11:
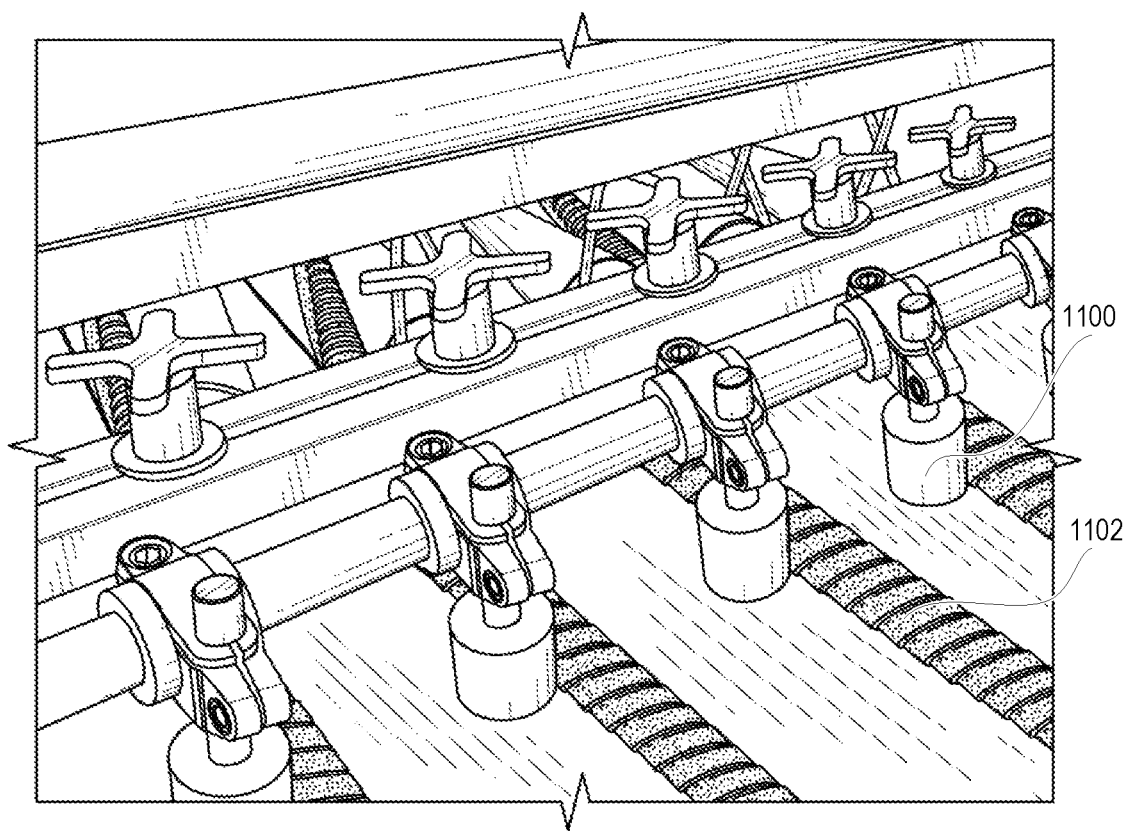
FIG. 11 illustrates a perspective view of lateral positioners adjusting each rolled dough strip according to one or more embodiments.
Figure 12:
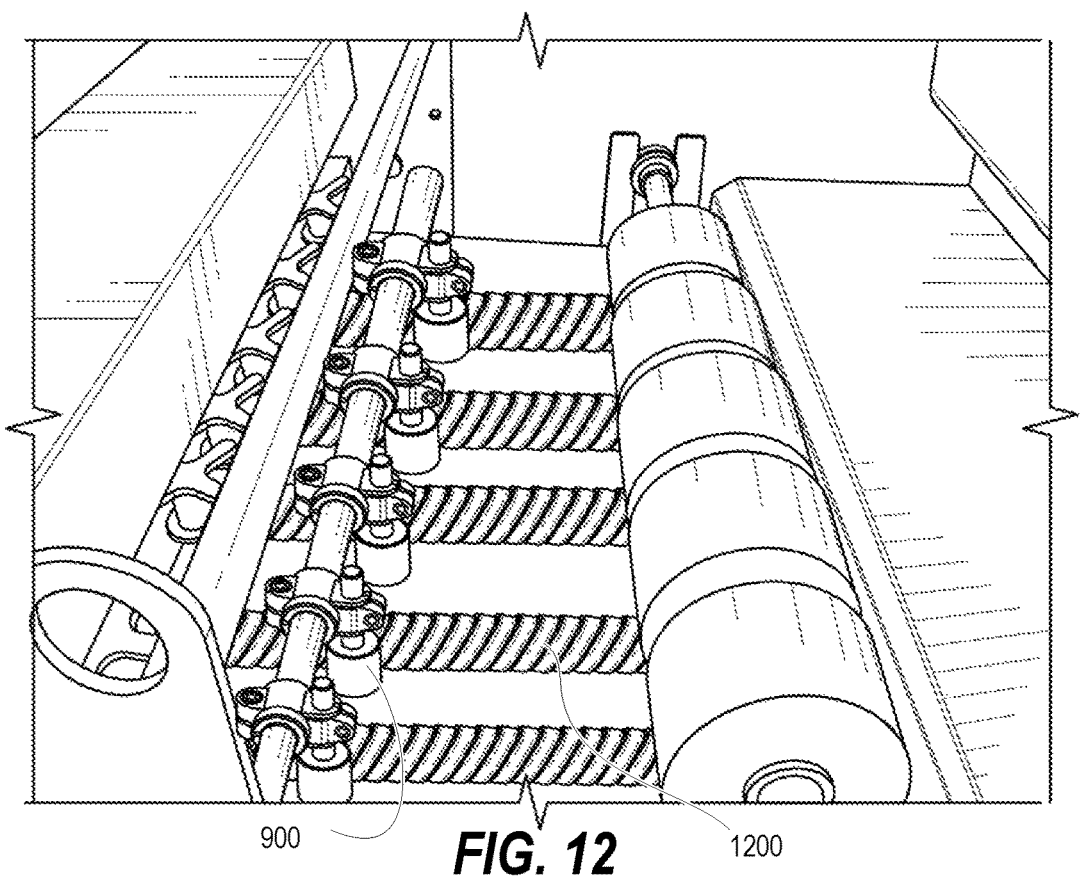
FIG. 12 illustrates a right perspective view of the lateral positioners that are followed by flattening rollers according to one or more embodiments.
Figure 13:
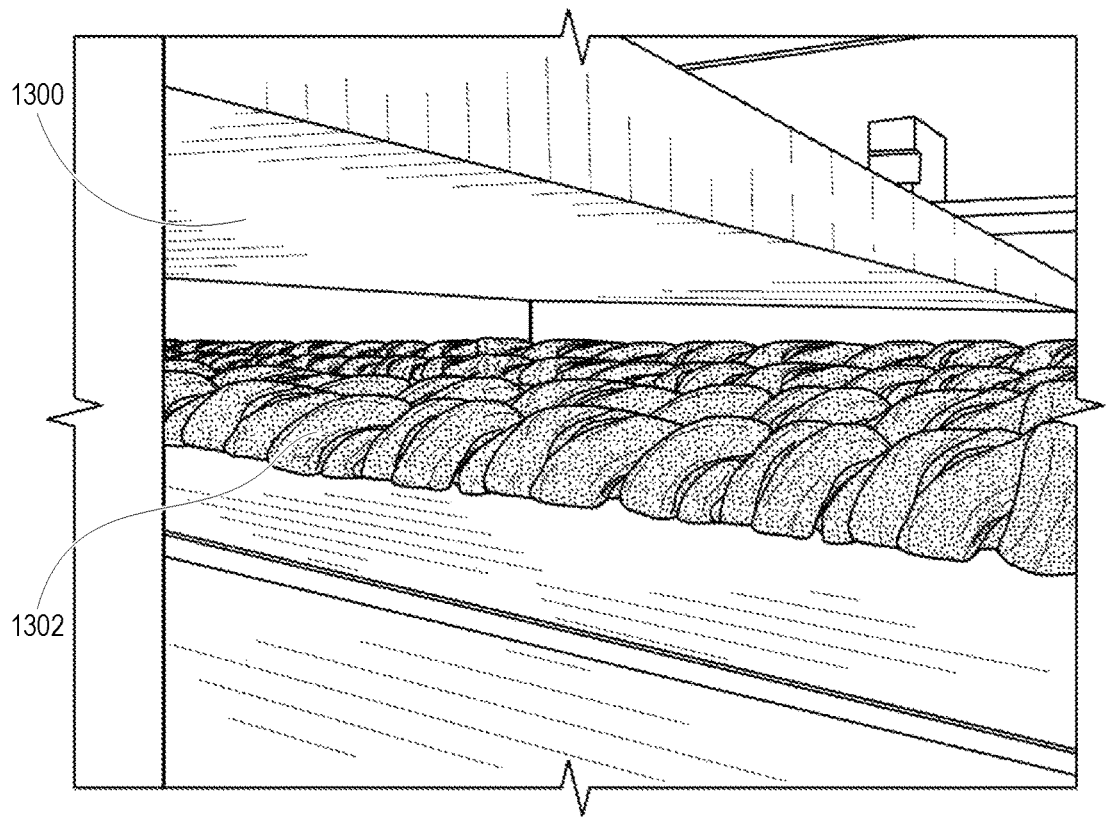
FIG. 13 illustrates a perspective view of a controlled heat and humidity conveyor that conveys the unbaked pretzel bites according to one or more embodiments.
Figure 14:
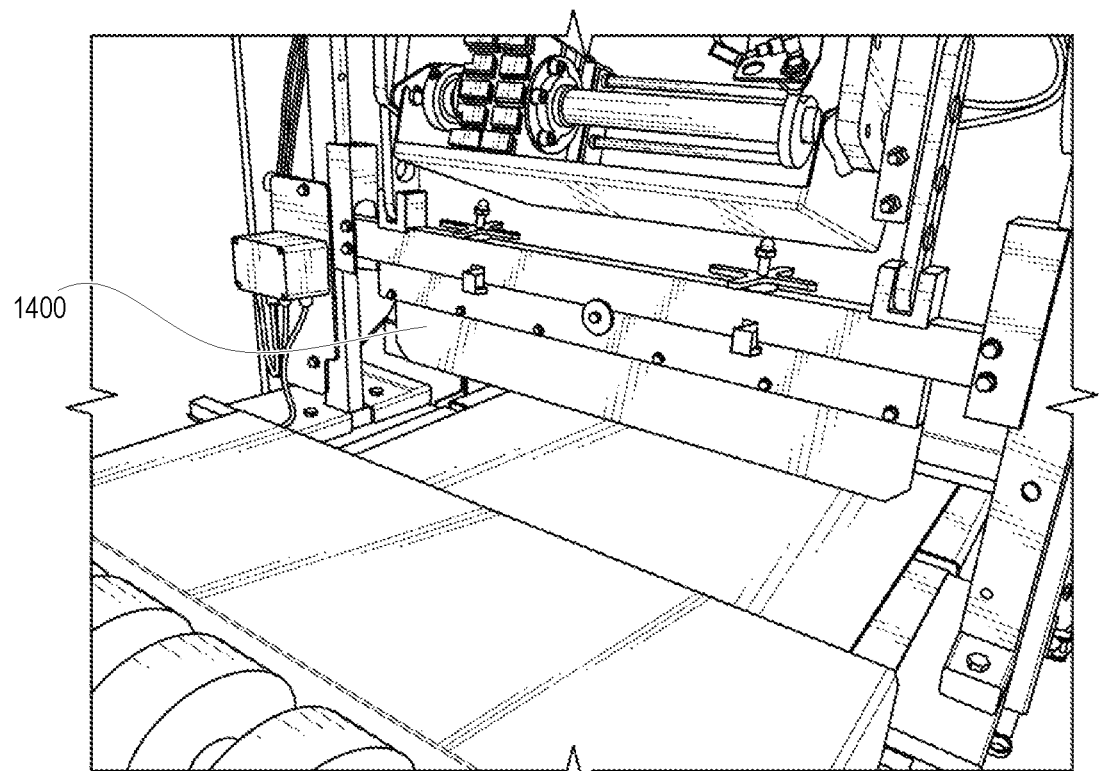
FIG. 14 illustrates a right perspective view of a lateral cutting guillotine, according to one or more embodiments.
Figure 15:
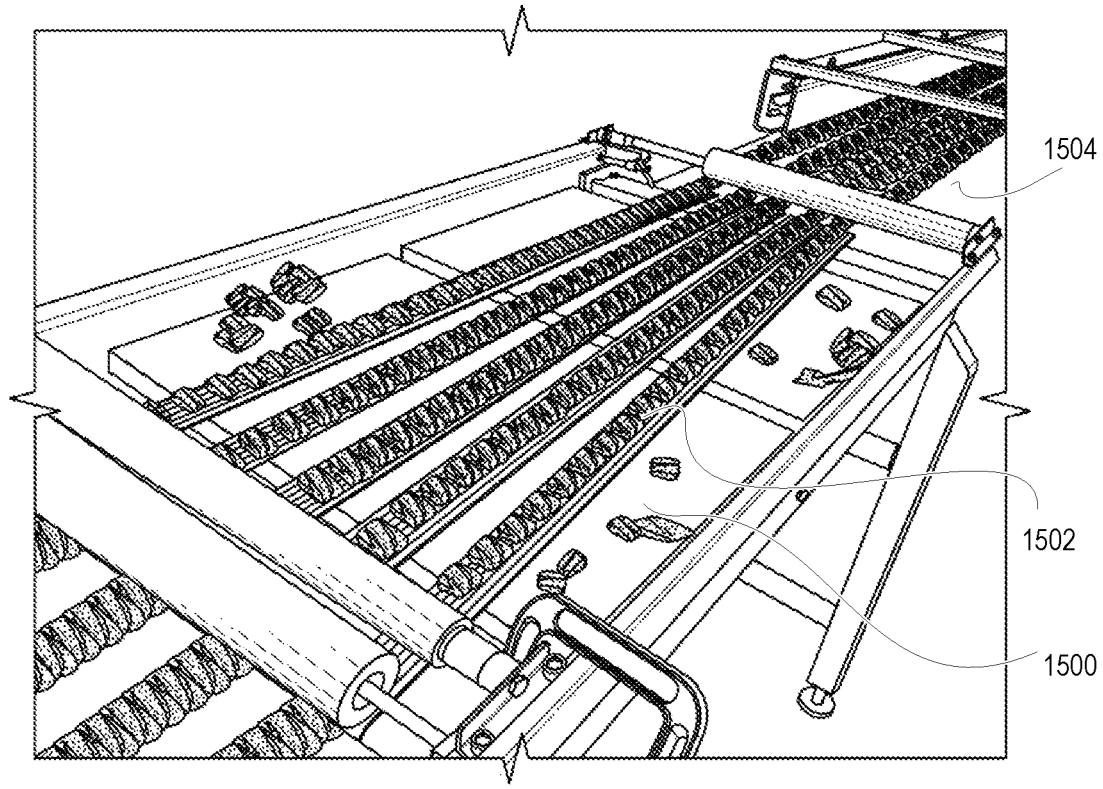
FIG. 15 illustrates a perspective view of a converging conveyer that places the five columns of unbaked pretzel bites into close lateral proximity according to one or more embodiments.
Figure 16:
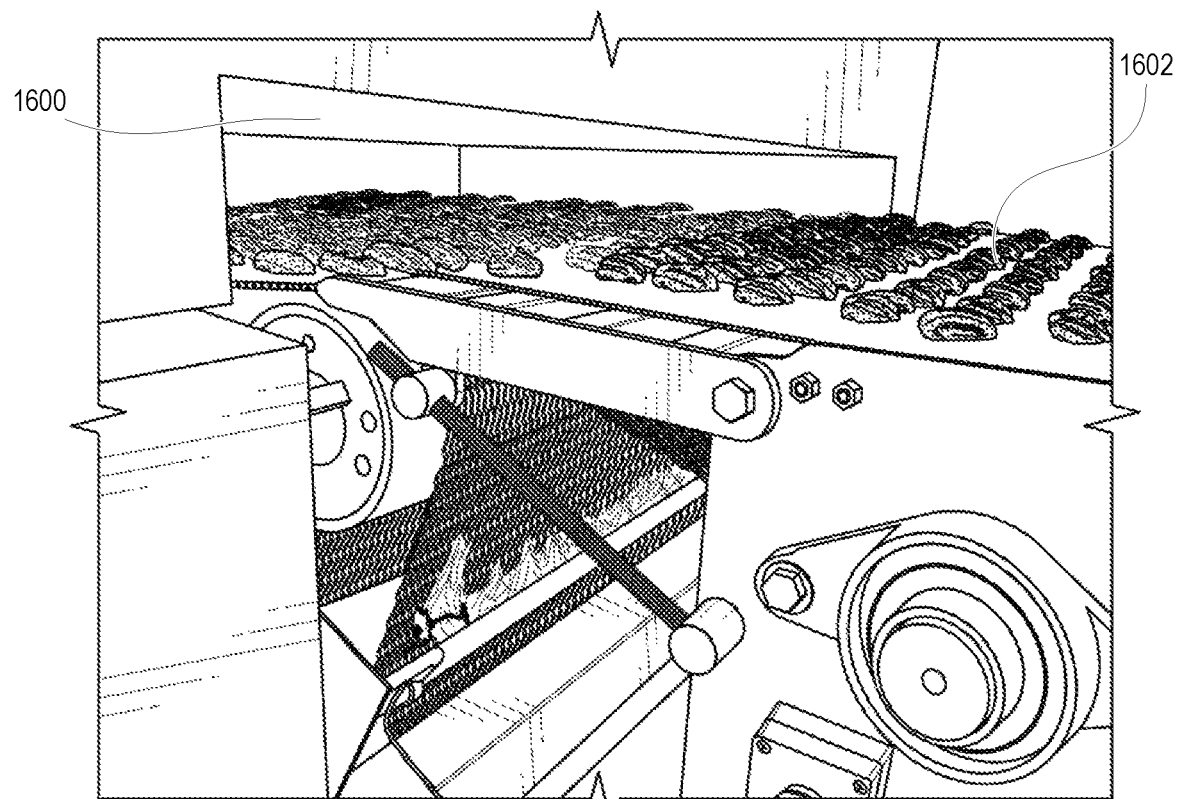
FIG. 16 illustrates a perspective view of a caustic washer that washes the unbaked pretzel bites according to one or more embodiments.
Figure 17:
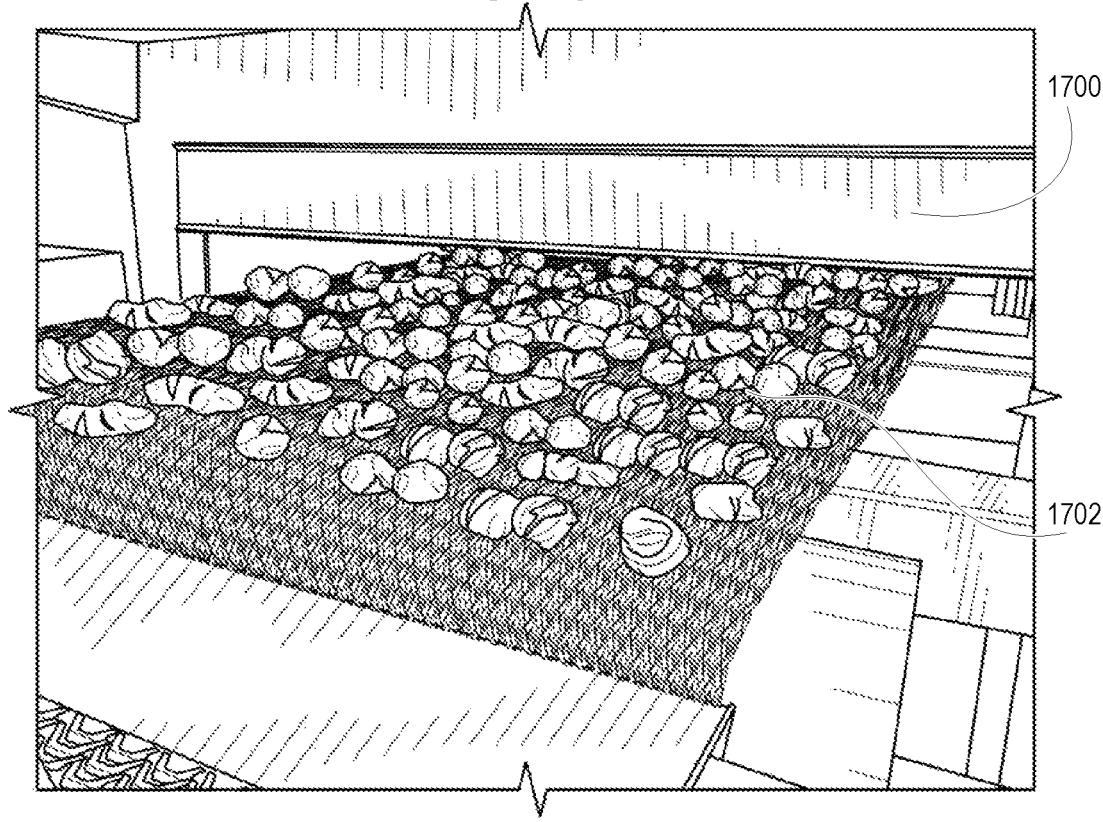
FIG. 17 illustrates a perspective view of a baking conveyor that bakes the pretzel bites according to one or more embodiments.

FIG. 2 illustrates a top perspective view of a dough hopper 200. Star wheels 202 at the bottom of the hopper 200 rotate and pinch off a mass of dough 204 in an appropriate amount to the rollers (not shown). FIG. 3 illustrates a right perspective view of a conveyor 300 conveying an untrimmed dough sheet 302 from the hopper 200 (FIG. 2). FIG. 4 illustrates a multi-roller machine 400 with multiple small rollers 402 that rotate counter to a larger wheel apparatus 404 to thin the dough sheet (FIG. 3). In one embodiment, a multi-roller machine 400 with 6, 7, 8, 9, 10, 11, 12, or more small rollers 402 that rotate counter to a larger wheel apparatus 404 are used. This orientation provides the number of staged thinning actions to avoid tearing the dough and also provides a reduced footprint over a linear layout. FIG. 5 illustrates a right perspective view of a conveyor 500 conveying a thinned and trimmed dough sheet 502. FIG. 6 illustrates a right perspective view of wheel cutters 600 cutting transverse slots in a dough sheet 602. FIG. 7 illustrates a right perspective view of a cover 700 guards the wheel cutters 600 (FIG. 6) and that is followed by disc cutters 702 that separate and trim the dough sheet 704 into parallel dough strips 706. The cutters 702 are weighted to cut through the dough. The number of cutters 702 is selected for the desired width of the resulting product. FIG. 8 illustrates a top perspective view of the disc cutters 702. FIG. 9 illustrates a perspective view of cone rollers 900 rolling each dough strip 902. A respective T-handle 904 supports a downstream end of each cone roller 900 and is laterally adjustable to affect where the seam ends up on the final product. FIG. 10 illustrates a plough 1000 upstream of and aligned with a cone roller 900 that initiates the curling and prevents dough from accumulating in front of the cone roller 900. FIG. 11 illustrates a perspective view of lateral positioners 1100 adjusting each rolled dough strip 1102. FIG. 12 illustrates a right perspective view of the lateral positioners 1100 are vertical rollers that are followed by horizontal pressing rollers 1200 that press out an air cavity that is first formed in the dough when rolled. Removing the air cavity prevents capture of caustic lye at a later stage. FIG. 13 illustrates a perspective view of a controlled heat and humidity conveyor 1300 that conveys the unbaked pretzel bites 1302. FIG. 14 illustrates a lateral cutting guillotine 1400 that separates the dough into unbaked pretzel bites 1302 (FIG. 13). FIG. 15 illustrates a perspective view of a converging conveyer 1500 that places the five columns of unbaked pretzel bites 1502 into close lateral proximity. The converging conveyor 1500 terminates slightly higher than a downstream reciprocating conveyor 1504 so that the unbaked pretzel bites 1502 do not bunch up at the transition. FIG. 16 illustrates a perspective view of a caustic washer 1300 that washes the unbaked pretzel bites 1602. FIG. 17 illustrates a perspective view of a baking conveyor 1700 that bakes the pretzel bites 1702.

Figure 18:
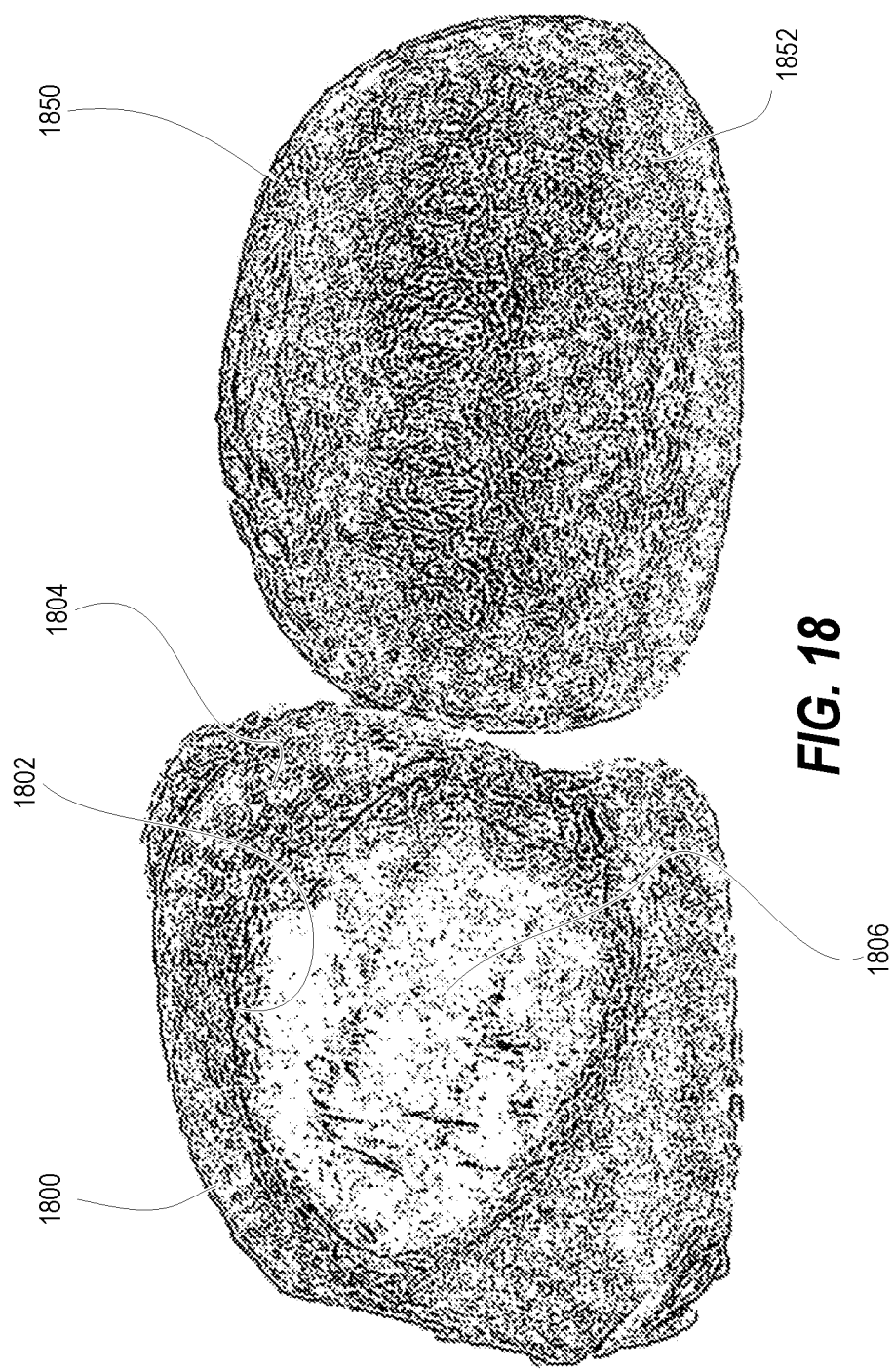
FIG. 18 illustrates a perspective view of a scored pretzel bite and an unscored pretzel bite according to one or more embodiments.

FIG. 18 illustrates a perspective view of a scored pretzel bite 1800 that has an opening 1802 in a pretzel skin 1804 that allowed for expansion of a soft interior 1806. By contrast, an unscored pretzel bite 1850 has an unperforated pretzel skin 1852 that prevented expansion of an interior (not shown).

Figure 19:
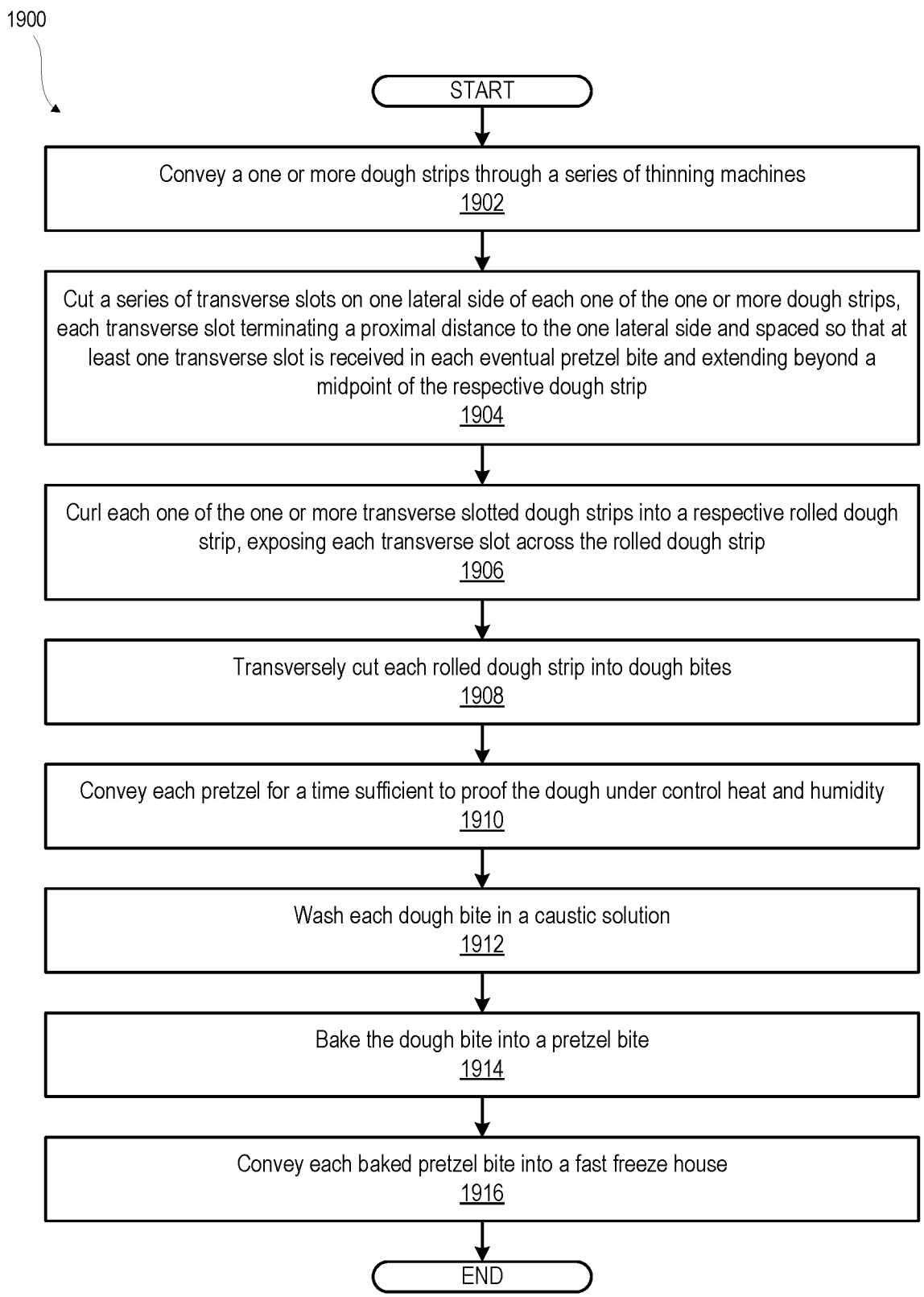
FIG. 19 illustrates a method of automatically making a soft pretzel bite according to one or more embodiments.

FIG. 19 illustrates a method 1900 of automatically making a soft pretzel bite. In one or more embodiments, the method 1900 begins conveying a one or more dough strips through a series of thinning machines (block 1902). In an exemplary embodiment, a dough strip is provided that is 30, 25, 20, 15, 10 mm thick dough strip or less, which is then thinned to 5, 4, 3, 2, 1 mm or less, followed by further one or more step downs to 0.7, 0.6, 0.5, 0.4, 0.3 mm or less. Method 1900 includes cutting a series of transverse slots on one lateral side of each one of the one or more dough strips, each transverse slot terminating a proximal distance to the one lateral side and spaced so that at least one transverse slot is received in each eventual pretzel bite and extending beyond a midpoint of the respective dough strip (block 1904). Method 1900 includes curling each one of the one or more transverse slotted dough strips into a respective rolled dough strip, exposing each transverse slot across the rolled dough strip (block 1906). Method 1900 includes transversely cutting each rolled dough strip into dough bites (block 1908).

Method 1900 includes conveying each pretzel for an hour under control heat and humidity (block 1910) for proofing. Proofing, such as rising, may take place in a steam box at relative humidity ranges from about 30%-95% and temperature ranges from about 40-150° F. for a time of about 10-120 minutes. In one exemplary embodiment, the proofing conveyor has two zones but they are slaved to one controller and operate in parallel. In another exemplary embodiment, the proofer is 50-150 feet long and runs from 0.1, 0.5, 1, 1.5, 2 or more meters per minute. In another exemplary embodiment, the proofer humidity ranges from 40%-90% and the temperature ranges from 50-100 F. In another exemplary embodiment, the proofing lasts for at least 10, 20, 30, 40, 50, 60 minutes or more is preferred, could be longer, could be cooler but can't get faster.

In an exemplary embodiment, the proofing is performed on a zoned conveyor that is 50 to 150 feet long and runs from 0.5 to 2 meters per minute. The zone conveyor exposes the product to at least 80, 90, 100° F. or more and at least 50, 60, 70, 80, 85% or more relative humidity for about 30, 40, 50, 60 minutes. The steam box can have a size of about A×B×C inches. Upon proofing, the thickness between the free-rise side and the bottom side increases from 10% to 120% of the diameter after rolling. Variations in the temperature, relative humidity, and time can be made, depending upon the intended result.

Method 1900 includes washing each dough bite in a caustic solution (block 1912). In an exemplary embodiment, each end of an exposed transverse slot extends lower than a midpoint of the exposed transverse slot allowing excess caustic solution to drain away from the dough bite.

Once the segments are formed by the cutting step, the formed products are conveyed to a caustic bath for a caustic bath step. The caustic bath, using prior art methods, typically is about a 0.1%, 0.5%, 1%, 1.5%, 2% or more caustic aqueous solution between 80 to 200° F. In one embodiment, the caustic aqueous solution is between 80 to 160° F.

The dwell time during the caustic bath step, depending on the product being made, can range from less than 10 seconds to up to about 25 seconds. In one or more embodiments, the caustic concentration is between about 0.1% and about 0.5%, or more preferably about 0.3%, for a dwell time of preferably at least 0.5, 1, 2, 3, 4, 5, 10, 15, 20, 25 seconds or more. In another embodiment, the shape is passed under a "waterfall" sodium hydroxide solution, which may be at room temperature in one form of the present disclosure.

The dough is sprayed with a caustic solution, preferably on one side of a flat surface of dough. The caustic solution used in the present invention may be any that are known in the art, and include: sodium hydroxide, lye, caustic soda, potassium hydroxide, natural caustics, synthesized caustics, calcium hydroxides, sodium bicarbonate, or any other caustics useful for food preparation.

For the purposes of the present invention, the term "caustic" is expanded to include certain chemical compositions that would not ordinarily fit the common meaning of the term, but are in accordance with the inventive purpose. The term "caustic" therefore includes food acids, particularly weak acids such as acetic acid, lactic acid, ascorbic acid and oxidants, particularly peroxides, such as hydrogen peroxide. For these types of caustics, the treated surface will have a rough, slightly pitted, whitish or bleached appearance, and will have the texture of a pretzel and appearance of a pretzel without the brown color. The exterior will be toughened and crunchy in the manner of a pretzel. These embodiments are considered "pretzel-like" for the purposes of the present invention.

The caustic concentration may be any that accomplishes the goal of causing pretzel-like attributes when applied to a dough and baked. Upon reading this disclosure, those in the art would be able to modify the concentrations and application techniques (such as spraying, dipping, misting, etc.) so as to accomplish the pretzel-like attributes. The present invention therefore also includes the use of caustics having from 0.1 to 10% caustic concentration, preferably 2 to 9% concentration, most preferably 3 to 7% caustic concentration, by weight of the caustic and fluid modality. Ideally, the present invention involves the use of a basic caustic in water. The amount of caustic solution preferably applied is determined by the attributes desired, and the length of time applied prior to other handling.

The caustic application may be according to any means for applying a liquid to dough. For instance, caustic may be sprayed, dipped, misted, or applied via contact with a moist surface, such as a caustic-dipped sponge. Preferably, the caustic is applied via spraying. Salt may optionally be applied topically, at this stage, although it may also be applied before or after. Preferably, salt is applied after application of caustic solution, so as to adhere the salt to the dough.

The caustic-treated dough may then be packaged and sold as an intermediate product, either refrigerated or frozen, for subsequent baking by the consumer baking. Alternatively, the intermediate product can be baked prior to packaging, and distributed as a finished product. In baking the product, the dwell time between causting to oven is about 30 seconds and to about 15 minutes.

In one or more embodiments of the present invention, a hot water bath step may be used in place of the caustic bath. A "hot water bath" is meant generally to include either immersion of the dough product into a hot liquid comprising water or exposing the dough product to a steam bath. This hot water bath step promotes starch gelatinization, which is one of the effects of the traditional caustic bath.

In one or more embodiments of the present invention, a separate browning agent application step may be used. In one embodiment, the browning agent, e.g., pyrolized dextrose, is applied during the hot water bath step, as the browning agent is water soluble. The addition of the browning agent can, however, be applied separately in a later step. Coating of the dough with a browning agent in the browning agent step provides a uniform brown appearance, which is another effect promoted by the traditional caustic bath.

Method 1900 includes baking the dough bite into a pretzel bite (block 1914). In one or more embodiments, each transverse slot allows a volume of the pretzel bite to increase without being constrained by a pretzel skin formed around each transverse slot to aerate an interior of each pretzel bite. Baking can be accomplished according to any known means, and preferably includes at least one stage at 300° F. or less, and may also include a stage at a higher temperature, even up to 500° F. or more. Most preferably, baking takes place in a band oven with several stages of baking temperatures, ranging from around 300° F. to around 600° F. In an exemplary embodiment, the total dwell time during the baking step is typically between about 3 to about 10 minutes at a temperature of between 450 and 600° F. The product exits the baking step at a moisture level of typically between 8 and 15%.

In one or more embodiments, product exits the baking step at a moisture level of less than 30%. In one or more embodiments, product exits the baking step at a moisture level of less than 25%. In one or more embodiments, product exits the baking step at a moisture level of less than 20%. In one or more embodiments, product exits the baking step at a moisture level of less than 15%.

In one or more embodiments, the pretzel bite is salted after baking by wetting with water or oil and topping with salt. In additional embodiments, the pretzel bite is topped with other ingredients after baking by wetting with water or oil and topping with sesame seeds; pumpkin seeds; cheese; etc. In additional embodiments, the pretzel bite is cooked by deep fat frying and then topped with toppings.

Method 1900 includes conveying the baked pretzel bites into a fast freeze house (block 1916). In an exemplary embodiment, the freeze time is 30-60 minutes at a temperature of from about +10° F. to about −15° F. Then method 1900 ends.

In one or more embodiments of the present invention, the surface may be supplemented with an application of oil after baking, preferably when the pretzel bite is still hot. Oil may be applied in any method known in the art and includes spraying, dipping, application by an oil-soaked medium, such as a sponge, or any other application method that would result in oil selectively being applied to the surface. This application of oil is absorbed and provides additional flavor complexity, preferably at a rate of 0-25% by weight of the end product, more preferably 5-20% and most preferably at a rate of 10-15% by weight.

Any oil may be used, although those with the flavor and absorption qualities for the particular product may be modified as is known in the art. In particular, tropical oils may be selected from natural, or chemically enhanced oils, including soybean oil, cottonseed oil, canola (rapeseed) oil, peanut oil, safflower oil, sesame oil, sunflower oil, poppyseed oil, coconut oil, palm oil, palm kernel oil, olive oil, butterfat, cocoa butter, tallow, lard, babassue, corn oil, or combinations thereof.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of making one or more soft pretzel bites, comprising:
   providing one or more conveyors proximately beneath a sequence of:
   (i) one or more disc cutters;
   (ii) one or more wheel cutters;
   (iii) one or more cone rollers;
   (iv) one or more lateral cutting guillotines;
   (v) a caustic bath; and
   (vi) an oven;
   conveying a dough sheet to the one or more disc cutters that separate and trim a dough sheet into parallel one or more dough strips;
   conveying the parallel dough strips to the one or more wheel cutters that cut a series of transverse slots on one lateral side of the one or more dough strips, each transverse slot terminating a proximal distance to the one lateral side and spaced so that at least one transverse slot is received in each eventual pretzel bite and extending beyond a midpoint of the respective dough strip;
   conveying one or more dough strips to the one or more cone rollers that roll each one of the one or more of the transverse slotted dough strips into a respective rolled dough strip, exposing each transverse slot across the rolled dough strip;
   conveying the rolled dough strip to the one or more lateral cutting guillotines that transversely cut each rolled dough strip into one or more dough bites;
   conveying the one or more dough bites through a caustic bath that washes each dough bite in a caustic solution; and
   conveying the washed dough bites through the oven that bakes the washed dough bite into a soft pretzel bite,
   wherein each transverse slot allows a volume of the soft pretzel bite to increase without being constrained by a pretzel skin formed around each transverse slot to aerate an interior of each pretzel bite.

2. The method of claim 1, further comprising:
   receiving a thick dough sheet from a dough hopper; and
   conveying the thick dough sheet through a roller that thins the thick dough sheet into the dough sheet.

3. The method of claim 1, further comprising an apparatus that applies a filling onto the one or more dough strips prior to being conveyed to the one or more cone rollers.

4. The method of claim 1, further comprising an apparatus that encompasses an airspace and controls heat and humidity of the airspace, wherein the conveyor is configured to convey the dough bites for a period of time for proofing prior to conveying to the one or more lateral cutting guillotines.

5. The method of claim 1, further comprising a fast freeze house positioned to receive the pretzel bites.

6. The method of claim 1, wherein the one or more wheel cutters and the one or more cone rollers are cooperatively configured to produce the transverse slot having ends that extend lower than a midpoint of the exposed transverse slot allows caustic solution to drain away from the dough bite.

* * * * *